(12) United States Patent
Kim et al.

(10) Patent No.: US 11,095,803 B2
(45) Date of Patent: Aug. 17, 2021

(54) CAMERA LINKED WITH POS APPARATUS AND SURVEILLANCE METHOD USING THE SAME

(71) Applicant: Hanwha Techwin Co., Ltd., Seongnam-si (KR)

(72) Inventors: Kyung Duk Kim, Seongnam-si (KR); Hyun Ho Kim, Seongnam-si (KR); Min Jung Shim, Seongnam-si (KR)

(73) Assignee: HANWHA TECHWIN CO., LTD., Suwon-si (KR)

( * ) Notice: Subject to any disclaimer, the term of this patent is extended or adjusted under 35 U.S.C. 154(b) by 0 days.

(21) Appl. No.: 16/380,031

(22) Filed: Apr. 10, 2019

(65) Prior Publication Data

US 2019/0238743 A1 Aug. 1, 2019

Related U.S. Application Data

(63) Continuation of application No. PCT/KR2016/011780, filed on Oct. 20, 2016.

(30) Foreign Application Priority Data

Oct. 17, 2016 (KR) ........................ 10-2016-0134138

(51) Int. Cl.
*H04N 5/232* (2006.01)
*G06T 3/00* (2006.01)
(Continued)

(52) U.S. Cl.
CPC ......... *H04N 5/23203* (2013.01); *G06Q 20/20* (2013.01); *G06Q 20/206* (2013.01);
(Continued)

(58) Field of Classification Search
CPC . H04N 5/23203; H04N 5/232; H04N 5/23299
See application file for complete search history.

(56) References Cited

U.S. PATENT DOCUMENTS 5,751,346 A * 5/1998 Dozier ............ G08B 13/19641
348/153
7,617,981 B2 * 11/2009 Apte ...................... G06Q 20/20
235/454
(Continued)

FOREIGN PATENT DOCUMENTS

KR 10-0794614 B1 1/2008
KR 10-2008-0021730 A 3/2008
(Continued)

OTHER PUBLICATIONS

International Search Report (PCT/ISA/210) dated Jul. 3, 2017 issued by the International Searching Authority in International Application No. PCT/KR2016/011780.
(Continued)

*Primary Examiner* — Boubacar Abdou Tchoussou
(74) *Attorney, Agent, or Firm* — Sughrue Mion, PLLC

(57) ABSTRACT

A surveillance method using a POS apparatus includes receiving, by a point-of-sale (POS) apparatus, transaction information from a user, transmitting, by the POS apparatus, the transaction information to a camera management apparatus, transmitting, by the camera management apparatus, the transaction information to a camera, capturing, by the camera, an image of a surveillance region corresponding to the transaction information based on receiving the transaction information from the camera management apparatus, transmitting, by the camera, the captured image to the camera management apparatus, and storing, by the camera management apparatus, the image transmitted by the camera and the transaction information, respectively, in a storage.

15 Claims, 10 Drawing Sheets

(51) Int. Cl.
*H04N 7/18* (2006.01)
*G06Q 20/20* (2012.01)
*G06F 16/58* (2019.01)

(52) U.S. Cl.
CPC ........... *G06T 3/0018* (2013.01); *H04N 5/232* (2013.01); *H04N 5/23229* (2013.01); *H04N 5/23299* (2018.08); *H04N 7/188* (2013.01); *G06F 16/5866* (2019.01)

(56) References Cited

U.S. PATENT DOCUMENTS

| | | | | |
|---|---|---|---|---|
| 2005/0128304 | A1* | 6/2005 | Manasseh | G07C 9/00 348/207.99 |
| 2009/0115849 | A1* | 5/2009 | Landers, Jr. | G08B 13/19613 348/150 |
| 2010/0161422 | A1* | 6/2010 | Zeevi | G07G 1/0036 705/14.65 |
| 2012/0321146 | A1* | 12/2012 | Kundu | G07G 1/0036 382/118 |
| 2013/0002868 | A1* | 1/2013 | Yoshimitsu | H04N 5/247 348/143 |
| 2015/0138364 | A1* | 5/2015 | Enomoto | H04N 5/232 348/151 |
| 2016/0092740 | A1* | 3/2016 | Teller | G06K 9/6202 348/150 |
| 2016/0379145 | A1* | 12/2016 | Valentino, III | G06Q 10/105 705/7.13 |
| 2016/0379200 | A1* | 12/2016 | Phillips | G06Q 20/20 705/17 |
| 2018/0063394 | A1* | 3/2018 | Crooks | G06K 19/06037 |

FOREIGN PATENT DOCUMENTS

| | | |
|---|---|---|
| KR | 10-2011-0008649 A | 1/2011 |
| KR | 10-2014-0018626 A | 2/2014 |
| KR | 10-2014-0133620 A | 11/2014 |
| WO | WO-2017142191 A1 * 8/2017 | ............ G06Q 30/06 |

OTHER PUBLICATIONS

Written Opinion (PCT/ISA/237) dated Jul. 3, 2017 issued by the International Searching Authority in International Application No. PCT/KR2016/011780.

* cited by examiner

CAMERA LINKED WITH POS APPARATUS AND SURVEILLANCE METHOD USING THE SAME

CROSS-REFERENCE TO THE RELATED APPLICATIONS

This application is a Continuation of International Patent Application No. PCT/KR2016/011780, filed on Oct. 20, 2016, and claims priority from Korean Patent Application No. 10-2016-0134138, filed on Oct. 17, 2016, which is hereby incorporated by reference for all purposes as if fully set forth herein.

BACKGROUND

Field

Example embodiments of the present disclosure relate to a surveillance camera linked with a point-of-sales (POS) apparatus and a surveillance method using the same, and more particularly, a surveillance camera and a surveillance method which monitors a region based on an order input to a POS apparatus.

Description of the Related Art

A terminal or system of POS, which is an abbreviation for Point of Sales, refers to an electronic system or device for managing and integrating sales and inventory management. POS apparatuses are used in a wide range of stores, such as convenience stores, restaurants, and big marts, which sell products directly to consumers. Recently, as the patterns of distribution expenditure become complicated, systems fused with supply chain management (SCM) and customer relationship management (CRM) are being introduced. Due to the development of mobile Internet technology, the mobile POS (mPOS) or Ethernet POS (ePOS) terminal market has expanded, and there has been a trend to add the function of receiving or transmitting useful information using mobile devices or through network connections to include the ability to receive or send useful information through mobile devices or through network connections.

Generally, surveillance systems are widely used in various places such as banks, department stores, and residential areas. These surveillance systems are mainly used for crime prevention and security purposes. A system commonly used as a surveillance system is a closed circuit television (CCTV) system in which cameras are installed at locations to capture images of a desired area and a user can monitor the images captured by the cameras using a connected monitoring device.

There exists a method in which receipt information recorded in a POS apparatus is transmitted to a video storage device such as a digital video recorder (DVR) or a network video recorder (NVR) and is then stored together with a surveillance image so that the receipt image can be used as metadata when searching for the image later. This method focuses on monitoring improper behavior of the seller and the buyer by interlocking a surveillance camera installed at the counter with the POS apparatus to store image information of the seller and the buyer together with receipt information. This method can be useful in stores and can use order information as a search keyword or display calculation information on the screen. However, this method cannot monitor a desired area and cannot store information regarding the desired area to use it in searches.

To address the aforementioned problems, embodiments of the present invention provide a surveillance camera system linked with a POS apparatus, which can facilitate searches by monitoring a region of interest in accordance with the details of each transaction and storing corresponding information together with a captured image.

Additional advantages, subjects, and features of the present invention will be set forth in part in the description that follows and in part will become apparent to those having ordinary skill in the art upon examination of the following or may be learned from practice of the present invention.

SUMMARY

According to an aspect of an example embodiment, there is provided a surveillance method including receiving, by a point-of-sale (POS) apparatus, transaction information from a user, transmitting, by the POS apparatus, the transaction information to a camera management apparatus, transmitting, by the camera management apparatus, the transaction information to a camera, capturing, by the camera, an image of a surveillance region corresponding to the transaction information based on receiving the transaction information from the camera management apparatus, transmitting, by the camera, the captured image to the camera management apparatus, and storing, by the camera management apparatus, the image transmitted by the camera and the transaction information, respectively, in a storage.

The surveillance method may further include receiving, by the POS apparatus, completed transaction information from the user, transmitting, by the POS apparatus, the completed transaction information to the camera management apparatus, transmitting, by the camera management apparatus, the completed transaction information to the camera, and terminating, by the camera, the capturing of the image of the surveillance region corresponding to the completed transaction information based on receiving the completed transaction information.

The camera may be a pan-tilt-zoom camera, and the capturing, by the camera, the image of the surveillance region corresponding to the transaction information may include controlling, by a controller included in the camera, a posture of the camera such that the camera captures the image of the surveillance region corresponding to the transaction information.

The transaction information may include a plurality of pieces of transaction information, and the capturing, by the camera, the image of the surveillance region corresponding to the transaction information may further include sequentially capturing images of a plurality of surveillance regions corresponding to the plurality of pieces of transaction information.

The surveillance region may include plurality of surveillance regions, and the capturing, by the camera, the image of the surveillance region corresponding to the transaction information may further include sequentially capturing images of the plurality of surveillance regions.

The sequentially capturing the images of the plurality of surveillance regions may include capturing an image of a first surveillance region for a first predetermined amount of time, controlling, by the controller, the posture of the camera to move from the first surveillance region to a second surveillance region after the first predetermined time, and capturing an image of the second surveillance region for a second predetermined amount of time.

The camera may be a fisheye camera, and the storing the image transmitted by the camera may include dewarping the image transmitted by the camera.

The camera may be a fisheye camera, and the capturing, by the camera, the image of the surveillance region corresponding to the transaction information may include dewarping the captured image and transmitting the dewarped image to the camera management apparatus.

The surveillance method may further include searching for, by a processor included in the camera management apparatus, an image and the transaction information stored in the storage, respectively, by a user input by the user and based on the transaction information.

The surveillance method may further include receiving, by the POS apparatus, a tag corresponding to the transaction information from the user, and storing the tag in the storage with the corresponding transaction information and the image of the surveillance area corresponding to the transaction information, wherein the searching for the image stored in the storage, may include searching for the image stored in the storage based on the tag.

The receiving, by the POS apparatus, the transaction information from the user may include receiving the transaction information from a plurality of POS apparatuses.

The transaction information may include coordinates of the surveillance region corresponding to the transaction information.

According to an aspect of an example embodiment, there is provided a surveillance camera including an image sensor capturing an image of a surveillance region corresponding to transaction information from a user, which is received by a point-of sale (POS) apparatus and is transmitted by the POS apparatus via a camera management apparatus, based on the transaction information being received, and a communication interface transmitting the captured image and the transaction information to the camera management apparatus, such that the camera management apparatus stores the captured image and the transaction information.

Based on the communication interface receiving completed transaction information, which is received by the POS apparatus by the user and is transmitted by the POS apparatus via the camera management apparatus, the image sensor may terminate the capturing of an image of a surveillance region corresponding to the completed transaction information.

The surveillance camera may be a pan-tilt-zoom camera, and the surveillance camera may further include a controller controlling a posture of the surveillance camera for the image sensor to capture the image of the surveillance region corresponding to the transaction information.

Based on the transaction information including a plurality of pieces of transaction information, the surveillance camera may sequentially capture images of a plurality of surveillance regions corresponding to the plurality of pieces of transaction information.

Based on the surveillance region including a plurality of surveillance regions corresponding to the transaction information, the surveillance camera may sequentially capture images of the plurality of surveillance regions.

The surveillance camera may capture each of the plurality of images of the multiple surveillance regions for a predetermined amount of time.

The surveillance camera may be a fisheye camera.

The communication interface may dewarp the captured image and transmits the dewarped image to the camera management apparatus.

BRIEF DESCRIPTION OF DRAWINGS

The above and/or other aspects will become apparent and more readily appreciated from the following description of example embodiments, taken in conjunction with the accompanying drawings in which.

DETAILED DESCRIPTION

Figure 1:
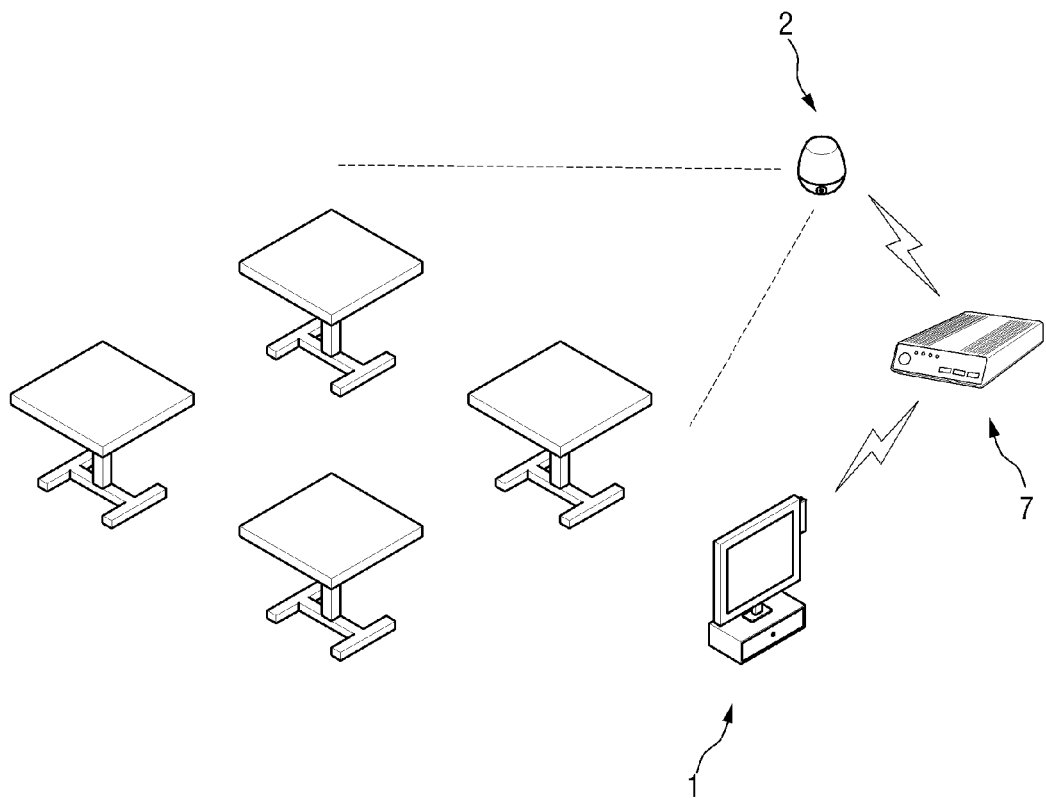
FIG. 1 is a schematic view illustrating the configuration of a surveillance camera system according to an example embodiment.

Advantages and features of the present disclosure and methods of accomplishing the same may be understood more readily by reference to the following detailed description of embodiments and the accompanying drawings. The present disclosure may, however, be embodied in many different forms and should not be construed as being limited to the example embodiments set forth herein.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

For example, as used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", when used in this specification, specify the presence of stated features, regions, integers, steps, operations, elements, and/or components, but do not preclude the presence or addition of one or more other features, regions, integers, steps, operations, elements, components, and/or groups thereof.

Moreover, example embodiments are described herein with reference to cross-sectional illustrations and/or plane illustrations that are idealized exemplary illustrations. Accordingly, variations from the shapes of the illustrations as a result, for example, of manufacturing techniques and/or tolerances, are to be expected. In the drawings, embodiments of the present invention are not limited to the specific examples provided herein and are exaggerated for clarity. The same reference numerals or the same reference designators denote the same elements throughout the specification.

The term "and/or" encompasses both combinations of the plurality of related items disclosed and any item from among the plurality of related items disclosed. Expressions such as "at least one of", when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Example embodiments of the present disclosure will hereinafter be described with reference to the accompanying drawings.

FIG. 1 is a schematic view illustrating the configuration of a surveillance camera system according to an example embodiment.

Referring to FIG. 1, the surveillance camera system includes a camera 2, which monitors a peripheral area, a POS apparatus 1, which receives an order, and a camera management apparatus 7, which performs management operations such as storing an image captured by the camera 2 and controlling the camera 2.

The POS apparatus 1, which is an ordering apparatus capable of performing POS operations, may receive transaction information from a user and may transmit the received transaction information to the camera management apparatus 7 and to the camera 2 via the camera management apparatus 7. The POS apparatus 1 may be a personal computer (PC)-based POS apparatus or may be a POS apparatus that is configured as an ePOS or mPOS apparatus using a portable device such as a smartphone, a tablet PC, or a laptop.

The transaction information that the POS apparatus 1 may receive includes, but is not limited to, surveillance region number information, surveillance region occupation time information, sales amount information, order details, membership information, and the number of people.

The camera management apparatus 7 is connected to the POS apparatus 1 and the camera 2. The camera management apparatus 7 controls the camera 2 using information received from the POS apparatus 1 and stores and manages images received from the camera 2.

The camera 2 is a device that captures an image of a peripheral area. The camera 2 receives light reflected or emitted from the peripheral area, converts the received light into an electrical signal, and transmits the electrical signal to the camera management apparatus 7. The peripheral area is a region that can be monitored by the camera 2, and the camera 2 is generally disposed to face a part of the peripheral area to be monitored.

Figure 2:
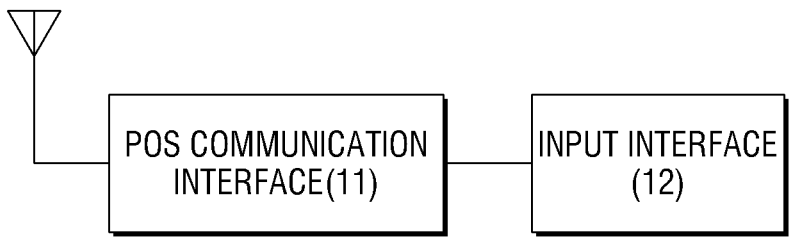
FIG. 2 is a block diagram illustrating the configuration of a POS apparatus according to an example embodiment.

FIG. 2 is a block diagram illustrating the configuration of the POS apparatus 1 according to an example embodiment.

Referring to FIG. 2, the POS apparatus 1 includes a POS communication interface 11 and an input interface 12.

The input interface 12 is provided for the POS apparatus 1 to receive the transaction information from a user. The input interface 12 may display a user interface for user convenience. The input interface 12 may be a portable device such as a smart phone, a tablet PC, a laptop, or the like, or a non-portable device such as a desktop, a video wall, or the like. However, embodiments of the present disclosure are not limited thereto.

The input interface 12 may use, for example, a touch sensor, a mouse, a keyboard, a joystick, a remote controller, or the like as input means. However, embodiment of the present disclosure are not limited thereto.

The input interface 12 may further receive a tag corresponding to the transaction information from the user. The POS apparatus 1 may store the tag together with a captured image which makes it easier to search for a captured image by marking any specific matters regarding the surveillance region with the tag.

The POS communication interface 11 is connected to a first communication interface 71 of the camera management apparatus 7, and transmits the transaction information and the tag, received from the user via the input interface 12, to the first communication interface 71. The POS communication interface 23 may be connected to the first communication interface 71 in a wired or wireless manner or via a network.

For the POS apparatus 1 to more easily calculate and manage the transaction information, a settlement unit for performing settlement for the transaction information may be provided, and a POS printer for outputting a receipt may also be provided. Also, card settlement information may be transmitted via the POS communication interface 23. The configuration of the POS apparatus 1 is not particularly limited, and operations necessary for managing the transaction information may be added to the POS apparatus 1.

Figure 3:
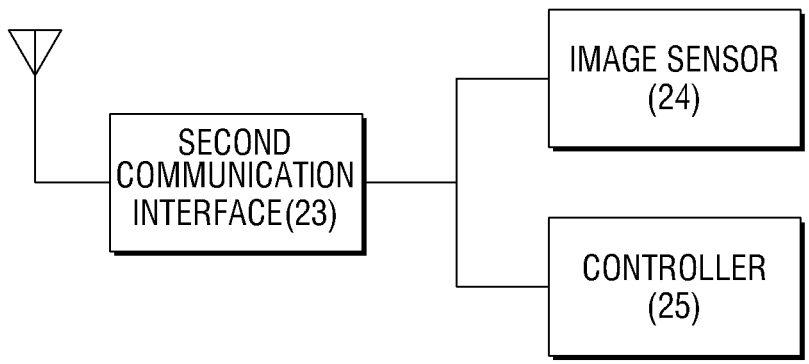
FIG. 3 is a block diagram illustrating the configuration of a surveillance camera according to an example embodiment.

FIG. 3 is a block diagram illustrating the configuration of the camera 2 according to an example embodiment.

The camera 2 may be a general box-type camera, a pan-tilt-zoom (PTZ) camera, a digital PTZ (DPTZ) camera, a 4K camera, a fisheye camera, or the like, but the type of the camera 2 is not particularly limited.

Referring to FIG. 3, the camera 2 includes a second communication interface 23, an image sensor 24, and a controller 25.

The image sensor 24, which is an element of a camera, is generally disposed at the front of the camera 2 and includes a lens system which receives and condenses light and an image sensor which obtains a valid signal from the light condensed by the lens system. A charge-coupled device (CCD), a complementary-metal-oxide-semiconductor (CMOS), or the like may be used as the image sensor, but example embodiments are not limited thereto. The image sensor 24 may also include a video encoder such as a video graphics array (VGA) encoder for the image sensor to transform an optical signal recognized by the image sensor into data that can be stored. That is, the optical signal may be processed into data that is reproducible, by being stored or transmitted via the video encoder.

The second communication interface 23 is connected to the first communication interface 71 of the camera management apparatus 7. The second communication interface 23 receives the transaction information from the first communication interface 71 and transmits the transaction information to the controller 25 of the camera 2. Also, the second communication interface 23 is connected to the image sensor 24 and transmits an image captured by the image sensor 24 to the first communication interface 71. Also, the second communication interface 23 may further transmit transaction information corresponding to a captured surveillance region to the first communication interface 71. The second communication interface 23 may be connected to the first communication interface 71 in a wired or wireless manner or via a network.

The camera 2 may include a sensor such as, for example, a gyro sensor, which is capable of measuring the posture of the surveillance camera 2, or an acceleration sensor. However, example embodiment are not limited thereto.

The controller 25 is an element that controls the posture of the camera 2. The controller 25 may physically change the posture of the camera 2 in accordance with a control signal and may rotate the image sensor 24 using a driving member such as a motor. If the camera 2 used in the surveillance camera system is of a type that can determine its direction only if its entire posture of the camera 2 is adjusted, the driving member may be used at a location where the camera 2 is connected to a fixing surface, so that the posture of the entire camera 2 can be adjusted. If the camera 2 used in the surveillance camera system is a PTZ camera or the like that can control only the image sensor 24 that is included in a housing, the driving member may be configured to be connected to the image sensor 24 and thus to control the image sensor 24. The controller 25 may further include an encoder, and thus, the degree to which the controller 25 is driven can be determined.

In order for the camera 2 to monitor the surveillance region corresponding to the transaction information, received from a control apparatus for the camera 2, the controller 25 may be configured to memorize the coordinates of a surveillance information corresponding to each transaction information in advance. Thus, the controller 25 may further include a storage medium to store information. In response to the transaction information being received, the controller 25 may read out the coordinates of the corresponding surveillance region that are stored in advance and may control the posture of the camera 2 such that the camera 2 or the image sensor 24 is oriented to the read-out coordinates.

Figure 4:
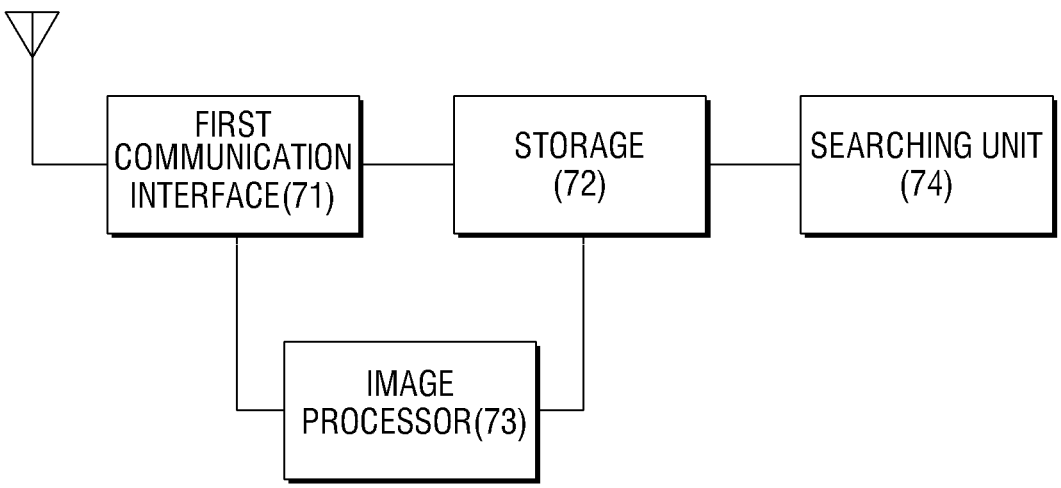
FIG. 4 is a block diagram illustrating the configuration of a camera management apparatus according to an example embodiment.

FIG. 4 is a block diagram illustrating the configuration of the camera management apparatus 7 according to an example embodiment.

Referring to FIG. 4, the camera management apparatus 7 may include the first communication interface 71, a storage unit 72, an image processor 73, and a search unit 74.

The first communication interface 71 is connected to the POS communication interface 11 of the POS apparatus 1 and the second communication interface 23 of the camera 2. The POS apparatus 1 receives the transaction information or the tag, received from the user via the input interface 12, from the first communication interface 71 and an image captured by the camera 2, and transaction information corresponding to the image from the second communication interface 23 and provides them to the storage unit 72 so that the storage unit 72 can store them. The first communication interface 71 may be connected to the POS communication interface 11 and the second communication interface 23 in a wired or wireless manner or via a network.

The storage unit 72 stores a captured image, transaction information, and a tag received from the first communication interface 71. Accordingly, a storage medium needs to be used as means for storing such data. A hard disk drive (HDD), a solid state drive (SSD), a compact flash (CF) card, or a secure digital (SD) card may be used as the storage medium, but the present invention is not limited thereto.

The image processor 73 processes a captured image, received from the camera 2, and transmits the processed image to the storage unit 72. The image processor 73 may transmit the processed image to the storage unit 72 such that the processed image can be stored in the storage unit 72 to correspond to the transaction information and the tag received from the POS apparatus 1. However, example embodiment are not limited thereto. According to an example embodiment, an image processor 73 may generate a corrected image by dewarping a cropped image and may transmit the generated image to the storage unit 72.

A semiconductor device capable of performing logic operations, such as a central processor unit (CPU), a micro controller unit (MCU), a microprocessor, or a field programmable gate array (FPGA), may be used as the image processor 73, but embodiments are not limited thereto.

The search unit 74 searches through images stored in the storage unit 72. Accordingly, the search unit 74 may provide a search interface 8 for the user via a display device, may receive search conditions desired by the user based on a user input via the search interface 8, and may display search results. The search unit 74 may be configured as a smartphone, a laptop, a desktop, or the like, but embodiments are not limited thereto. The search unit 74 may be provided with a touch sensor, a mouse, a keyboard, a joystick, a remote control, or the like as input means, but the embodiments are not limited thereto.

The first communication interface 71, the second communication interface 23, and the POS communication interface 11 may include network modules for wired or wireless communication, and the network modules may be configured as 3G or LTE modems, which are wireless network modules, or may use other methods such as ZigBee, WLAN, Bluetooth, or the like. Also, serial ports, universal serial bus (USB) ports, or the like for using Ethernet cards (or NIC cards) or chips or cables such as RS-485, RS-232 or the like may be provided as wired network modules, but embodiments are not limited thereto.

Figure 5:
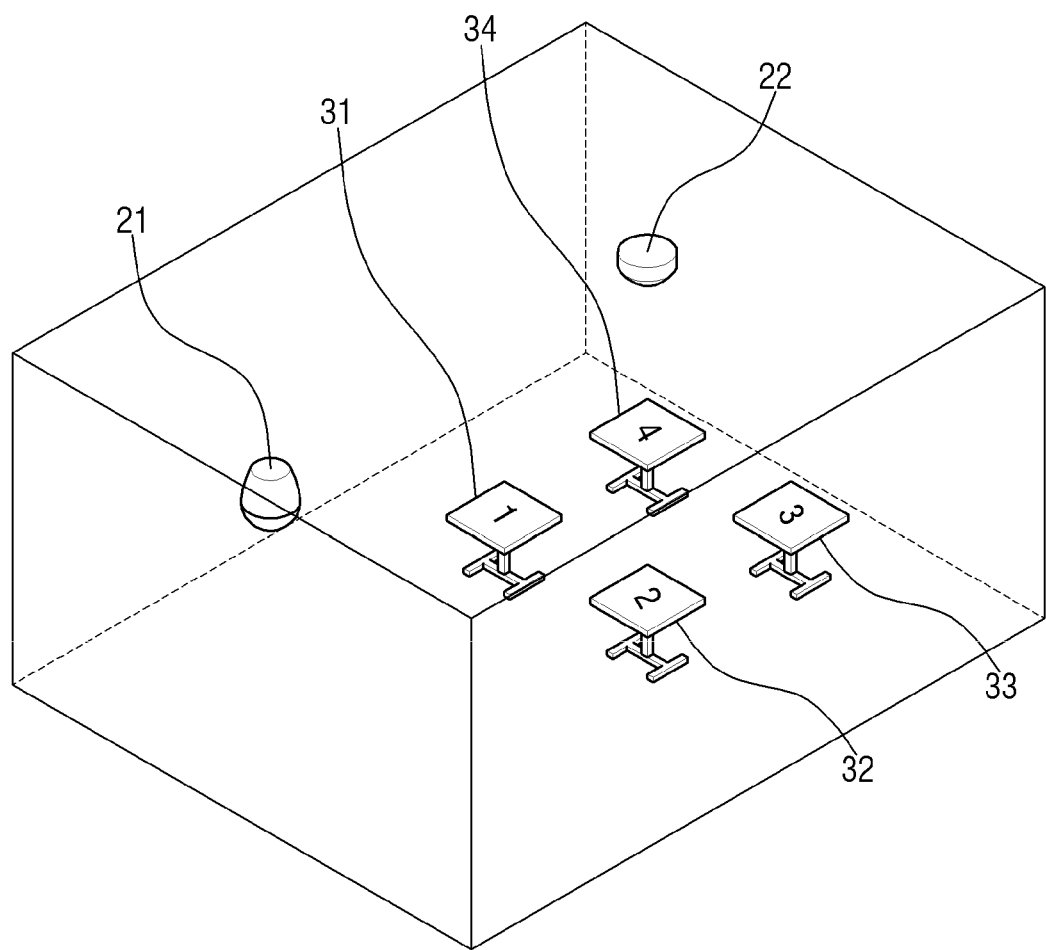
FIG. 5 is a perspective view illustrating how surveillance cameras according to example embodiments are installed.
Figure 6:
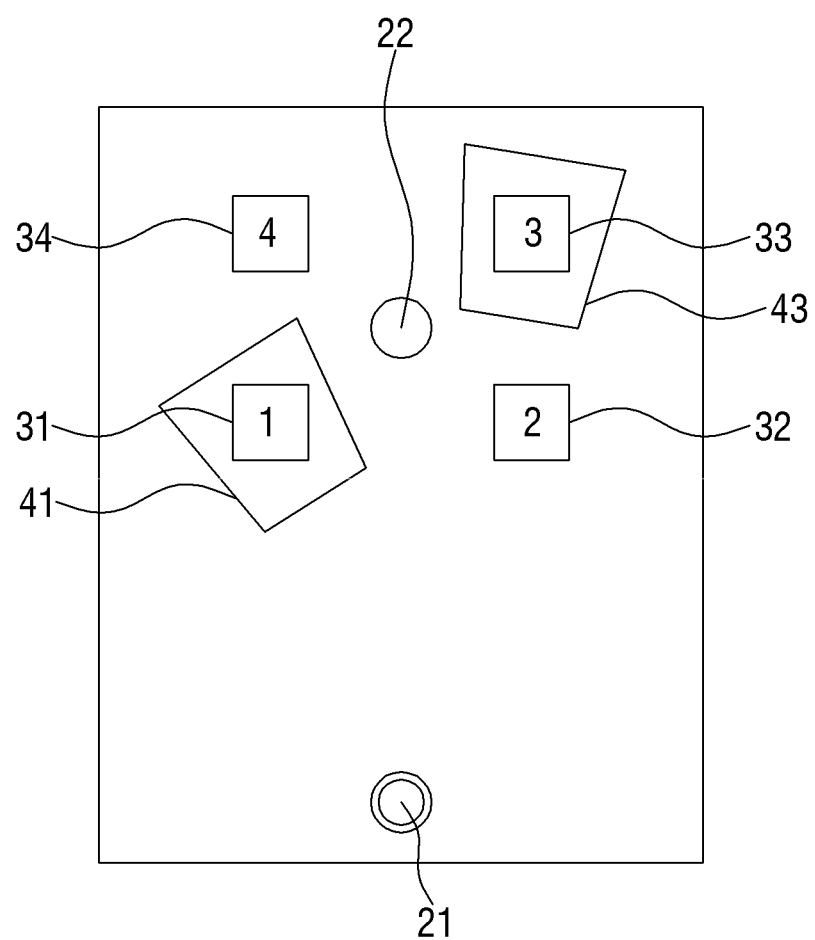
FIG. 6 is a plan view illustrating a surveillance camera system according to an example embodiment and surveillance regions as viewed from thereabove.
Figure 7:
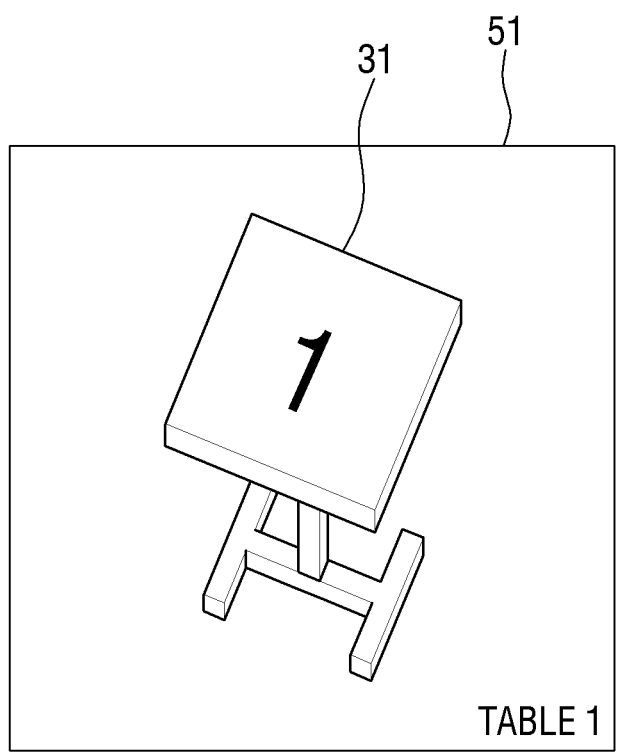
FIG. 7 is a schematic view illustrating how an image of a surveillance region, captured by the surveillance camera system according to an example embodiment is stored in a camera management apparatus.

Referring to FIGS. 5, 6, and 7, a method to monitor a region of interest using the surveillance camera system according to an example embodiment will be described.

FIG. 5 is a perspective view illustrating how surveillance cameras 21 and 22 according to example embodiments are installed.

Referring to FIG. 5, in a predetermined space where tables are provided, a surveillance camera 21 and/or surveillance camera 22 system is installed. For example, in a predetermined space such as a restaurant, multiple tables 31, 32, 33, and 34 may be provided, and the area including the multiple tables 31, 32, 33, and 34 may become a main surveillance region. According to an example embodiment, the camera which needs to change its posture to change surveillance regions, is used. For example, a PTZ camera 21 may be used. The surveillance cameras 21 and 22 may be installed at one sidewall or the ceiling of the predetermined space to mainly monitor the multiple tables 31, 32, 33, and 34, which are generally disposed on the floor in the predetermined space. FIG. 5 illustrates that the camera 21 is installed on the ceiling on one side of the predetermined space and a total of four tables, i.e., first table 31, second table 32, third table 33, and fourth table 34, are disposed on the floor of the predetermined space.

In response to a transaction being made by, for example, a customer entering the predetermined space, claiming a table, and placing an order, the user may enter transaction information to the POS apparatus 1 of the surveillance camera system. The transaction information entered via the input interface 12 of the POS apparatus 1 is transmitted to the first communication interface 71 of the camera management apparatus 7 via the POS communication interface 11, and the first communication interface 71 transmits the transaction information to the second communication interface 23 of the camera 21.

The camera 21 reads out the coordinates of a surveillance region corresponding to the transaction information received from the storage medium included in the controller 25, and controls the posture of the camera 21 such that the image sensor 24 may capture an image of the read-out coordinates. The read-out coordinates may be PTZ coordinates for controlling the posture of the PTZ camera 21. Also, the coordinates of the surveillance region corresponding to the transaction information may be received from the camera management apparatus 7 together with the transaction information. In this case, the storage unit 72 of the camera management apparatus 7 may need to further store the coordinates of the surveillance region corresponding to the transaction information.

FIG. 6 is a plan view illustrating the surveillance camera system according to an example embodiment and a surveillance region as viewed from thereabove.

Referring to FIG. 6, the camera 21 may have a surveillance region corresponding to each of the multiple tables, and the surveillance region may be configured to be sufficiently identifiable from a captured image of the corresponding table. The location of the surveillance region may be set directly by the user via a user input on the POS apparatus 1 or the camera management apparatus 7, or may be set in advance by the installer of the surveillance camera system when the surveillance camera system is installed for the first time.

As illustrated in FIG. 6, since each surveillance region corresponds to an area appearing in an image captured by the camera 21, which is installed on the ceiling on one side of the predetermined space, each surveillance region may have a trapezoidal shape whose width increases away from the camera 21 and which includes a table. In FIG. 6, for example, transaction information including surveillance region numbers corresponding to the first table 31 and third table 33 are input by the user. Thus, first table surveillance region 41 and third table surveillance region 43 are illustrated in FIG. 6 as being trapezoids.

The controller 25 of the camera 21 controls the posture of the camera 21 in accordance with the coordinates of each of the first table surveillance region 41 and third table surveillance region 43. In this case, the image sensor 24 continuously captures images, and the controller 25 allows the camera 21 to face the first table surveillance region 41 for a predetermined amount of time and then moves the camera 21 to be directed to the third table surveillance region 43. A predetermined amount of time after moving the camera 21 from the first table surveillance region 41 to the third table surveillance region 43, the controller 25 moves the camera 21 again to be directed to the first table surveillance region 41. These processes are repeated until monitoring is finished. Thus, the controller 25 of the camera 21 according to an example embodiment may further include a timer. In this manner, an image of each surveillance region may be sequentially captured by sequentially moving the camera 21 from one surveillance region to another surveillance region, and staying in each surveillance region for a predetermined amount of time to capture an image. In the example of FIG. 6, since transaction information corresponding to the first table 31 and third table 33 is transmitted to the camera 21, the camera 21 may capture images while sequentially moving between the first table surveillance region 41 and third table surveillance region 43. The transaction information may correspond to multiple surveillance regions. Thus, in this case, images are captured by sequentially moving between the multiple surveillance regions.

For example, the camera 21 may be set to stay in each surveillance region for one minute, but embodiments are not limited thereto. Also, the camera 21 may be configured to move from one surveillance region to another surveillance region in the order of which corresponding transaction information is input, but the order in which the camera 21 moves from one surveillance region to another surveillance region is not particularly limited. For example, the camera 21 may be chosen to move from one surveillance region to another surveillance region in a clockwise or counterclockwise direction.

The monitoring of each surveillance region by the camera 21 may be repeated until the user inputs completed transaction information for a transaction that has been settled to the input interface 12 of the POS apparatus 1, and the completed transaction information is transmitted to the camera 21. Once the completed transaction information is transmitted to the camera 21, the controller 25 controls the posture of the camera 21 such that the camera 21 is not directed to a surveillance region corresponding to the completed transaction information. Then, naturally, the monitoring of the surveillance region corresponding to the completed transaction information is finished.

FIG. 7 is a schematic view illustrating how an image of a surveillance region, captured by the surveillance camera system according to an example embodiment is stored in the camera management apparatus 7.

A captured image is transmitted to the first communication interface 71 via the second communication interface 23, and is then stored in the storage unit 72. The captured image may be stored together with transaction information, received from the POS apparatus 1, by the image processor 73.

Referring to FIG. 7, the first table 31 appears in an image that the camera 21 captures while staying in the first table surveillance region 41. Since transaction information corresponding to the captured image is stored together with the captured image, text indicating the first table 31 may be displayed in a part of the captured image. Also, the transaction information and a tag stored together with the captured image may be displayed together with the captured image.

Figure 8:
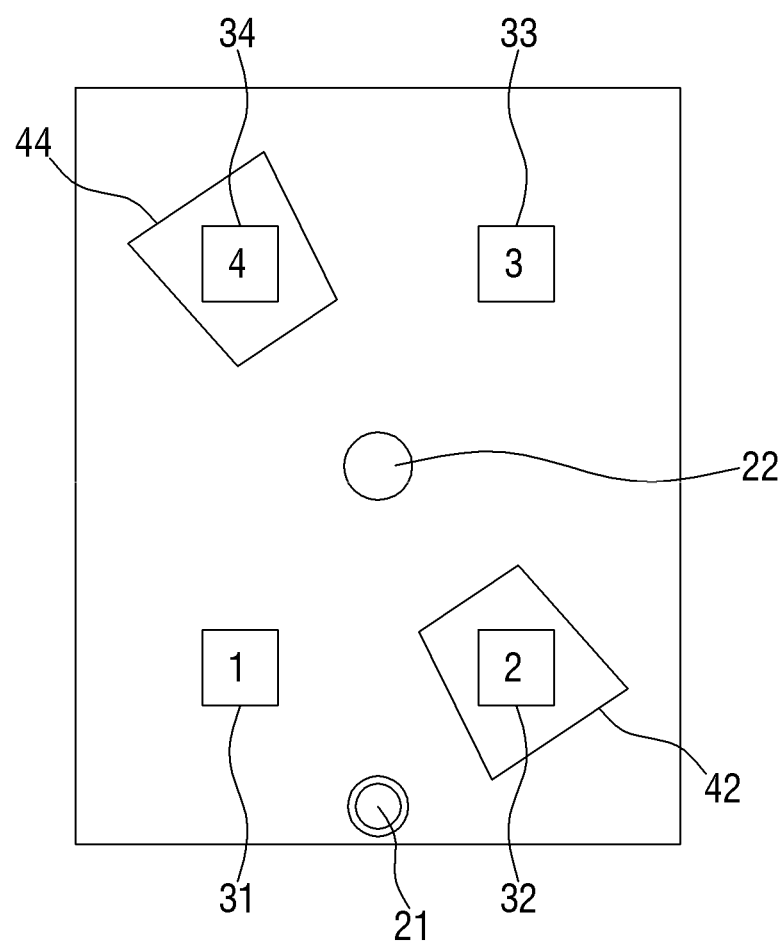
FIG. 8 is a plan view illustrating a surveillance camera system according to an example embodiment and surveillance regions as viewed from thereabove.
Figure 9:
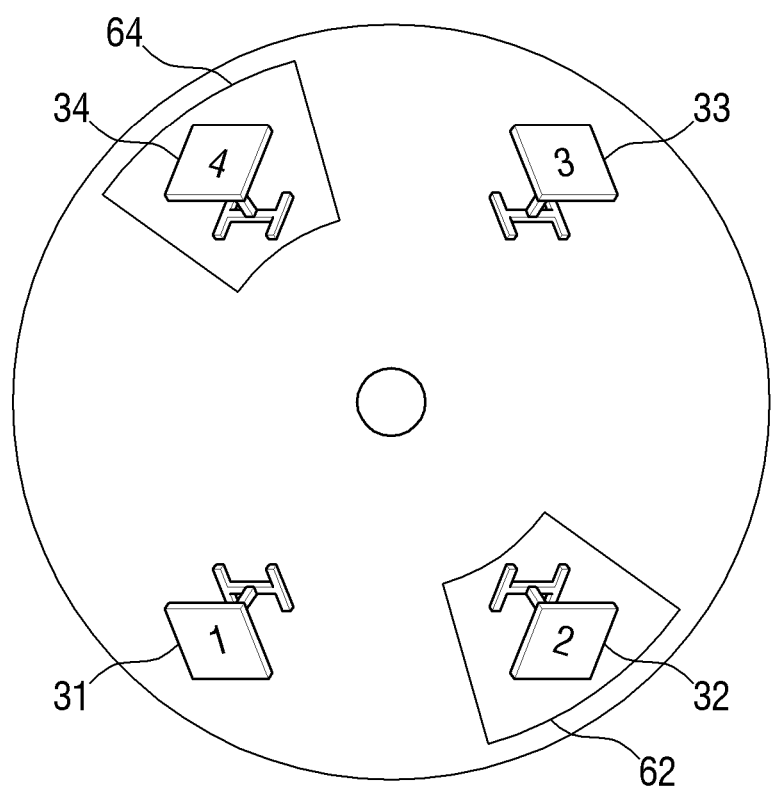
FIG. 9 is a schematic view illustrating an image captured by the surveillance camera system according to an example embodiment and surveillance regions.
Figure 10:
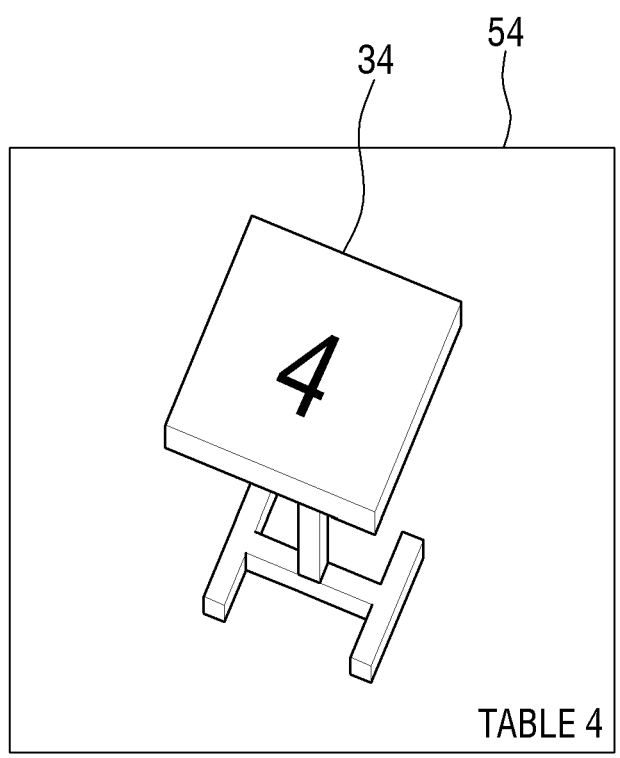
FIG. 10 is a schematic view illustrating an image obtained by dewarping an image of one surveillance region, captured by the surveillance camera system according to an example embodiment.

Referring to FIGS. 8, 9, and 10, a method to monitor a region of interest using the surveillance camera system according to an example embodiment will be described.

FIG. 8 is a plan view illustrating a surveillance camera system according to an example embodiment and surveillance regions as viewed from thereabove.

As described above, the camera may be a fisheye camera 22 capable of capturing a wide angle image, or may be a 360° camera. The 360° camera 22 may be a camera which is equipped with multiple fisheye lenses and is thus capable of photographing all directions without the need to be panned or tilted directly. However, embodiments are not limited to thereto. Various types of cameras may be used as the camera 22 according to the example embodiment based on a need to correct an original image to some extent.

The correction of an original image distorted by a fisheye lens is generally referred to as distortion calibration or dewarping, and dewarping may be performed via a formula using parameters such as the focal distance or optical center position of the fisheye lens 20 depending on which projection method is used in the fisheye lens 20.

According to the example embodiment of the present invention, an original image may be dewarped into a corrected image by software in the camera management apparatus 7, or the camera 22 may dewarp the original image and may transmit the dewarped image to the camera management apparatus 7.

Referring to FIG. 8, a surveillance camera system is installed in a predetermined space such as a restaurant where multiple tables 31, 32, 33, and 34 are provided. The surveillance camera 22 may be installed on the ceiling of the predetermined space because it is mainly for monitoring the multiple tables 31, 32, 33, and 34 that are generally disposed on the floor in the predetermined space. Accordingly, in the example embodiment, the camera 22 may be installed at the center of the ceiling of the predetermined space and where it is surrounded by the multiple tables 31, 32, 33, and 34.

The transmission of transaction information after a transaction is made by, for example, a customer entering the predetermined space, claiming a table, and placing an order, is as already described above. In the example embodiment, the image sensor 24 of the camera 22 monitors an entire area. Accordingly, the posture of the camera is not controlled via the controller 25. Instead, a part of a current captured image corresponding to the coordinates of a surveillance region is cropped out, and the cropped-out image is transmitted to the camera management apparatus 7 via the second communication interface 23. Here, the coordinates of the surveillance region may not be the physical coordinates of the surveillance region, but the logical coordinates of the surveillance region in the captured image, and may be coordinate data including the coordinates of each apex or the distance or width from the center of the surveillance region to each apex because a predetermined area, rather than a predetermined point, is designated as the surveillance region. However, the type of the coordinates of the surveillance region is not particularly limited.

Also, the coordinates of a surveillance region corresponding to transaction information may be received from the camera management apparatus 7 together with the transaction information. Also, the camera 22 may capture an image of all surveillance regions and transmit the captured image to the camera management apparatus 7, instead of cropping out a part of the captured image and transmitting the cropped-out part of the captured image. In this case, the camera management apparatus 7 may store the coordinates of the surveillance region corresponding to the transaction information in the storage unit 72 together with the entire captured image. Then, a part of the captured image that corresponds to the surveillance region corresponding to the transaction information may be cropped out, and the cropped-out part of the captured image may be provided at a searching/browsing stage.

As illustrated in FIG. 8, since each surveillance region corresponds to an area appearing in an image captured by the camera 22, which is installed at the center of the ceiling of the predetermined space, each surveillance region has a trapezoidal shape whose width increases away from the camera 22. In the second embodiment, it is assumed that transaction information corresponding to the second and fourth tables 32 and 34 is input by the user. Thus, second and fourth table surveillance regions 42 and 44 are illustrated in FIG. 8 as being trapezoids.

The image sensor 24 of the camera 22 continuously captures images of all the surveillance regions, crops out a part of each captured image that corresponds to a surveillance region corresponding to received transaction information, and transmits the cropped part of each captured image to the camera management apparatus 7.

The monitoring of each surveillance region by the camera 22 is repeated until the user inputs completed transaction information for a transaction that has been settled to the input interface 12 of the POS apparatus 1, and the completed transaction information is transmitted to the camera 22. Once the completed transaction information is transmitted to the camera 22, the controller 25 controls the posture of the camera 22 so as for the camera 22 not to be directed to a surveillance region corresponding to the completed transaction information. Then, the monitoring of the surveillance region corresponding to the completed transaction information is finished.

FIG. 9 is a schematic view illustrating an image captured by the surveillance camera system according to an example embodiment and surveillance regions.

Referring to FIG. 9, when a fisheye camera or a 360° camera is used, a captured image of all surveillance regions may be circular. Since a wide angle image is generated, image distortion may be very severe in such image, unlike in an actual image that can be viewed with the naked eye. Thus, each surveillance region may be generated as being a polygon with curved edges. In the example of FIG. 9, the second table 32 and fourth table 34 may be designated to be monitored, and second table surveillance regions 62 and fourth table surveillance region 64 are illustrated as having a different shape from their respective counterparts of FIG. 8, even though they point to the same regions as their respective counterparts of FIG. 8.

As mentioned above, the camera 22 may crop out a part of a captured image that corresponds to a predetermined surveillance region and transmit the cropped-out part of the captured image to the camera management apparatus 7, or may transmit the entire captured image to the camera management apparatus 7 and allow the camera management apparatus 7 to crop out and provide the part of the captured image that corresponds to the predetermined surveillance region at a searching/browsing stage.

FIG. 10 is a schematic view illustrating an image obtained by dewarping an image of one surveillance region, captured by the surveillance camera (22) system according to the example embodiment.

A captured image is transmitted to the first communication interface 71 via the second communication interface 23 and is then stored in the storage unit 72. The captured image may be stored together with corresponding transaction information received from the POS apparatus 1, by the image processor 73.

In the example embodiment, the original captured image may be a distorted image. Thus, the original captured image may be dewarped by the camera 2 and may then be transmitted to the camera management apparatus 7. The original captured image may be dewarped by the camera management apparatus 7, and only a part of the captured image that corresponds to a surveillance region to be monitored may be cropped out and may then be provided by the camera management apparatus 7. The part of the captured image that corresponds to the surveillance region to be monitored may be cropped out and may then be dewarped. FIG. 10 illustrates a dewarped image of the fourth table with the distortion corrected.

Figure 11:
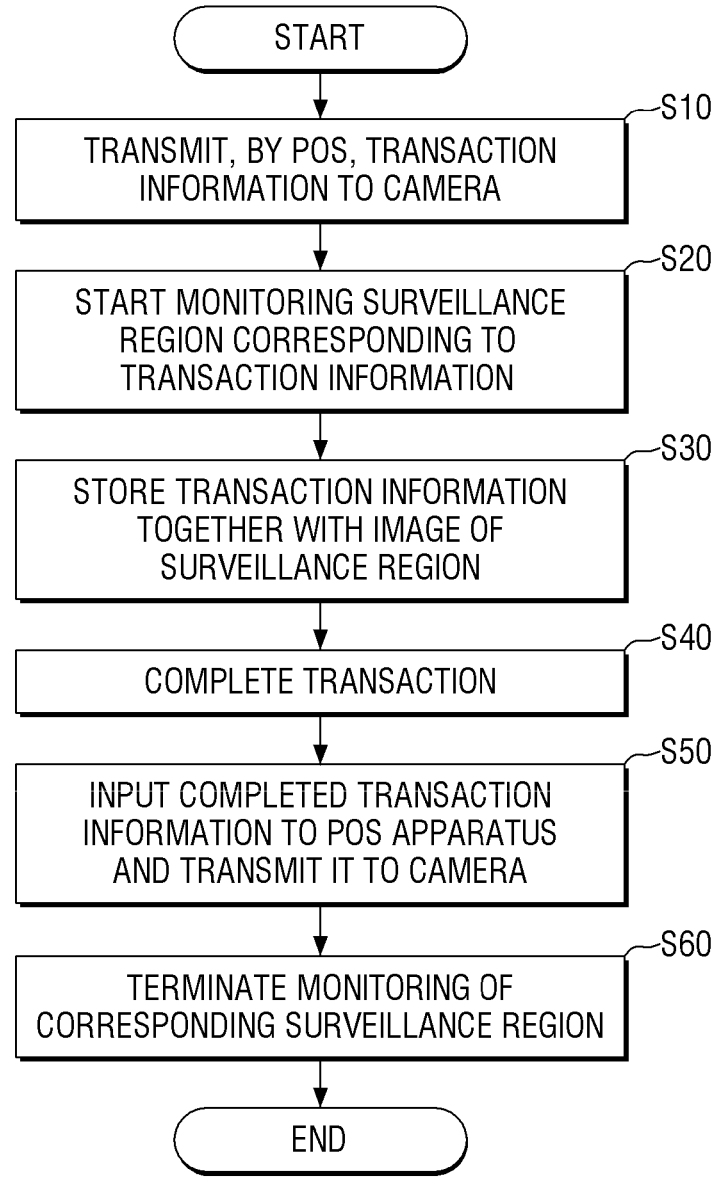
FIG. 11 is a flowchart illustrating a surveillance method according to an example embodiment.

FIG. 11 is a flowchart illustrating a surveillance method according to an example embodiment.

Referring to FIG. 11, the surveillance method starts with inputting, by the user, transaction information to the POS apparatus 1 of the surveillance camera system (S10). The user may also input a tag.

The transaction information, which is input via the input interface 12 of the POS apparatus 1, is transmitted to the first communication interface 71 of the camera management apparatus 7 via the POS communication interface 11, and the first communication interface 71 transmits the transaction information to the second communication interface 23 of the camera 2.

The camera 2 reads out the coordinates of a surveillance region corresponding to the transaction information from the storage medium included in the controller 25, and the image sensor 24 begins to monitor the surveillance region (S20). In the case of using a camera 2 such as a PTZ camera whose posture can be controlled, the controller 25 controls the posture of the camera 2 such that the camera 2 may capture an image of the coordinates of the surveillance region corresponding to the transaction information, and in the case of using a fisheye camera capable of capturing an image of all surveillance regions, an image of all of the surveillance regions is captured. In the case of using a PTZ camera, the controller 25 controls the posture of the image sensor 24 or the camera 2 such that the image sensor 24 or the camera 2 sequentially moves from one surveillance region to another surveillance region, captures an image and transmits the image to the camera management apparatus 7. In the case of using the fisheye camera 2, an image of all of the surveillance regions may be captured and may then be transmitted to the camera management apparatus 7, or a part of the captured image that corresponds to each surveillance region may be cropped out and may then be transmitted.

The camera management apparatus 7 stores the captured image in the storage unit 72 together with the transaction information (S30). To combine the transaction information and the captured image, the image processor 73 may be used. Transaction information and a tag can be input even after the receipt of initial transaction information. Thus, even when monitoring is being performed, the input interface 12 of the POS apparatus 1 may receive transaction information and tag information corresponding to each surveillance region, and transmit the transaction information and the tag information to the first communication interface 71 via the POS communication interface 11 so that the newly received transaction information and the tag information may be stored in the storage unit 72.

If the customer completes the transaction after finishing his or her business, the completion of the transaction is performed at the POS apparatus 1 (S40). Thus, the user inputs completed transaction information to the input interface 12 of the POS apparatus 1. Accordingly, the completed transaction information is transmitted to the first communication interface 71 of the camera management apparatus 7, and the first communication interface 71 transmits the completed transaction information to the second communication interface 23 of the camera 2 (S50).

The camera 2 receives the completed transaction information and terminates the monitoring of a surveillance region corresponding to the completed transaction information (S60). In the case of using a PTZ camera, the controller 25 terminates the monitoring of the surveillance region by controlling the camera 21 or the image sensor 24 not to face the surveillance region any longer. In the case of using a fisheye camera, the monitoring of the surveillance region may be terminated by controlling the camera 22 to stop cropping out a part of each captured image that corresponds to the surveillance region and transmitting the cropped-out part of each captured image or by allowing the camera management apparatus 7 to record the end time of the monitoring of the surveillance region.

Figure 12:
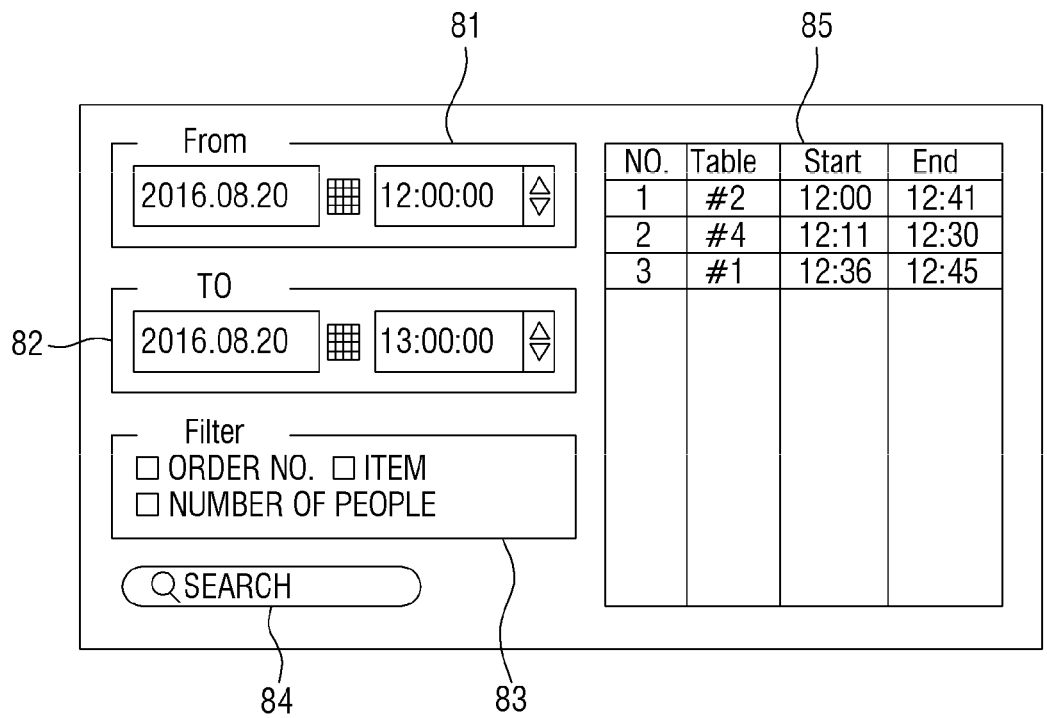
FIG. 12 is a schematic view illustrating a search interface provided by a searching unit according to an example embodiment.

FIG. 12 is a schematic view illustrating a search interface 8 provided by a searching unit 74 according to an example embodiment.

Referring to FIG. 12, the user may search for a desired captured image via the search interface 8, which is provided by a display apparatus. The user may enter a start time and an end time via a start time input part 81 and via an end time input part 82, respectively, to search for surveillance data corresponding to the period from the start time to the end time. Also, search fields may be designated via a filter input part 83, and transaction information may be entered via a keyword input part 84 to perform a search. Search results corresponding to information designated by the user are output to a result output part 85 in the form of a list, and the respective images stored in the storage unit 72 are configured to be selectable and identifiable via a click or a touch. The search fields, however, are not limited to the example of FIG. 14.

According to an example embodiment, a surveillance camera system may include multiple POS apparatuses 1. Accordingly, monitoring can be performed by sequentially capturing images of surveillance regions using transaction information received from the multiple POS apparatuses 1 or selectively storing a cropped-out image of each surveillance region.

According to surveillance camera system of the example embodiments, a surveillance region may be set in accordance with transaction information input to a POS apparatus, and as a result, an image of only a necessary region may be captured, thereby saving storage space. Further, the transaction information input to a POS apparatus may be stored together with a captured image, and thereby facilitate searches.

While example embodiments have been described with reference to the figures, it will be understood by one of ordinary skill in the art that various changes in form and details may be made therein without departing from the spirit and scope of the present disclosure as defined by the following claims.

What is claimed is:

1. A surveillance method comprising:
   receiving, by a point-of-sale (POS) apparatus, transaction information from a user;
   transmitting, by the POS apparatus, the transaction information to a camera management apparatus;
   transmitting, by the camera management apparatus, the transaction information to a camera;
   capturing, by the camera, an image of a surveillance region corresponding to the transaction information based on receiving the transaction information from the camera management apparatus, wherein the surveillance region is distant from a position of the POS apparatus;
   transmitting, by the camera, the captured image to the camera management apparatus; and
   storing, by the camera management apparatus, the image transmitted by the camera and the transaction information, respectively, in a storage;
   wherein the surveillance region comprises a plurality of surveillance regions,
   wherein a first surveillance region among the plurality of surveillance regions corresponds to a first transaction information from a first customer, and a second surveillance region among the plurality of surveillance regions corresponds to a second transaction information from a second customer different from the first customer, wherein the transaction information comprises a plurality of pieces of transaction information, wherein the capturing, by the camera, the image of the surveillance region corresponding to the transaction information comprises sequentially capturing images of the plurality of surveillance regions corresponding to the plurality of pieces of transaction information, and wherein the sequentially capturing the images of the plurality of surveillance regions comprises:
capturing an image of the first surveillance region for a first predetermined amount of time; and
capturing an image of the second surveillance region for a second predetermined amount of time after the first predetermined amount of time.

2. The surveillance method of claim 1, further comprising:
receiving, by the POS apparatus, completed transaction information from the user;
transmitting, by the POS apparatus, the completed transaction information to the camera management apparatus;
transmitting, by the camera management apparatus, the completed transaction information to the camera; and
terminating, by the camera, the capturing of an image of a surveillance region corresponding to the completed transaction information based on receiving the completed transaction information.

3. The surveillance method of claim 1, wherein
the camera is a pan-tilt-zoom camera, and
the capturing, by the camera, the image of the surveillance region corresponding to the transaction information comprises controlling, by a controller included in the camera, a posture of the camera such that the camera captures the image of the surveillance region corresponding to the transaction information.

4. The surveillance method of claim 1, wherein the sequentially capturing the images of the plurality of surveillance regions further comprises:
controlling, by a controller, a posture of the camera to move from the first surveillance region to the second surveillance region after the capturing the image of the first surveillance region and before the capturing the image of the second surveillance region.

5. The surveillance method of claim 1, wherein
the camera is a fisheye camera, and
the storing the image transmitted by the camera comprises dewarping the image transmitted by the camera.

6. The surveillance method of claim 1, wherein
the camera is a fisheye camera, and
the capturing, by the camera, the image of the surveillance region corresponding to the transaction information comprises dewarping the captured image and transmitting the dewarped image to the camera management apparatus.

7. The surveillance method of claim 1, further comprising:
searching for, by a processor included in the camera management apparatus, an image and the transaction information stored in the storage, respectively, by a user input by the user and based on the transaction information.

8. The surveillance method of claim 7, further comprising:
receiving, by the POS apparatus, a tag corresponding to the transaction information from the user; and
storing the tag in the storage with the corresponding transaction information and the image of the surveillance region corresponding to the transaction information,
wherein the searching for the image stored in the storage, comprises searching for the image stored in the storage based on the tag.

9. The surveillance method of claim 1, wherein the receiving, by the POS apparatus, the transaction information from the user comprises receiving the transaction information from a plurality of POS apparatuses.

10. The surveillance method of claim 1, wherein the transaction information comprises coordinates of the surveillance region corresponding to the transaction information.

11. A surveillance camera comprising:
an image sensor capturing an image of a surveillance region corresponding to transaction information from a user, which is received by a point-of sale (POS) apparatus and is transmitted by the POS apparatus via a camera management apparatus, based on the transaction information being received, wherein the surveillance region is distant from the position of the POS apparatus; and
a communication interface transmitting the captured image and the transaction information to the camera management apparatus, such that the camera management apparatus stores the captured image and the transaction information,
wherein the surveillance region comprises a plurality of surveillance regions, and wherein the image sensor sequentially captures images of the plurality of surveillance regions,
wherein a first surveillance region among the plurality of surveillance regions corresponds to a first transaction information from a first customer, and a second surveillance region among the plurality of surveillance regions corresponds to a second transaction information from a second customer different from the first customer,
wherein based on the transaction information comprising a plurality of pieces of transaction information, the surveillance camera sequentially captures images of the plurality of surveillance regions corresponding to the plurality of pieces of transaction information, and
wherein the sequentially capturing the images of the plurality of surveillance regions comprises:
capturing an image of the first surveillance region for a first predetermined amount of time; and
capturing an image of the second surveillance region for a second predetermined amount of time after the first predetermined amount of time.

12. The surveillance camera of claim 11, wherein based on the communication interface receiving completed transaction information, which is received by the POS apparatus by the user and is transmitted by the POS apparatus via the camera management apparatus, the image sensor terminates the capturing of an image of a surveillance region corresponding to the completed transaction information.

13. The surveillance camera of claim 11, wherein
the surveillance camera is a pan-tilt-zoom camera, and
the surveillance camera further comprises a controller controlling a posture of the surveillance camera for the image sensor to capture the image of the surveillance region corresponding to the transaction information.

14. The surveillance camera of claim 11, wherein the surveillance camera is a fisheye camera.

15. The surveillance camera of claim 14, wherein the communication interface dewarps the captured image and transmits the dewarped image to the camera management apparatus.

* * * * *